United States Patent
Blackwell et al.

(10) Patent No.: US 9,593,628 B2
(45) Date of Patent: Mar. 14, 2017

(54) GAS TURBINE ENGINE VARIABLE AREA FAN NOZZLE WITH ICE MANAGEMENT

(75) Inventors: Geoffrey T. Blackwell, Vernon, CT (US); William G. Tempelman, Ellington, CT (US); William J. McVey, Granby, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 897 days.

(21) Appl. No.: 13/365,481

(22) Filed: Feb. 3, 2012

(65) Prior Publication Data

US 2013/0192247 A1 Aug. 1, 2013

Related U.S. Application Data

(60) Provisional application No. 61/593,150, filed on Jan. 31, 2012.

(51) Int. Cl.
*F02C 1/00* (2006.01)
*F02C 9/16* (2006.01)
(Continued)

(52) U.S. Cl.
CPC .................. *F02C 9/16* (2013.01); *F02K 1/09* (2013.01); *F02K 3/06* (2013.01);
(Continued)

(58) Field of Classification Search
USPC ....... 60/39.093, 226.1, 242, 771; 244/134 R; 239/265.39
See application file for complete search history.

(56) References Cited

U.S. PATENT DOCUMENTS

| 2,469,375 A | 5/1949 | Flagle |
|---|---|---|
| 2,663,993 A | 12/1953 | Mosser |

(Continued)

FOREIGN PATENT DOCUMENTS

| GB | 579657 A | 7/1943 |
|---|---|---|
| GB | 1516041 | 6/1978 |

(Continued)

OTHER PUBLICATIONS

Walsh, Philip. "Gas Turbine Performance". Blackwell Publishing. 2004. p. 364.*

(Continued)

*Primary Examiner* — Gerald L Sung
(74) *Attorney, Agent, or Firm* — Carlson, Gaskey & Olds, P.C.

(57) ABSTRACT

A method of managing a gas turbine engine variable area fan nozzle includes the steps of evaluating an icing condition to determine the likelihood of ice presence. A variable area fan nozzle position is altered if ice is likely present or actually present. The gas turbine engine includes a fan nacelle including a flap configured to be moveable between first and second positions. An actuator is operatively coupled to the flap. A controller is configured to evaluate an icing condition to determine the likelihood of ice presence. The controller is configured to alter a variable area fan nozzle position schedule if ice is likely present by providing a command to the actuator to adjust the flap from the first position to the second position.

11 Claims, 2 Drawing Sheets

(51) Int. Cl.
F02K 1/09 (2006.01)
F02K 3/06 (2006.01)
(52) U.S. Cl.
CPC .. F05D 2260/605 (2013.01); F05D 2260/607 (2013.01); Y02T 50/675 (2013.01)

(56) References Cited

U.S. PATENT DOCUMENTS

| | | | |
|---|---|---|---|
| 3,287,906 | A | 11/1966 | McCormick |
| 3,932,058 | A * | 1/1976 | Harner et al. ............... 416/28 |
| 4,068,469 | A * | 1/1978 | Adamson ................... 60/204 |
| 4,397,431 | A * | 8/1983 | Ben-Porat ................ 244/53 B |
| 5,005,015 | A * | 4/1991 | Dehn et al. ................. 340/962 |
| 5,257,498 | A * | 11/1993 | Nikkanen et al. ......... 60/39.093 |
| 5,282,719 | A * | 2/1994 | McCarty et al. ............. 416/1 |
| 5,915,917 | A | 6/1999 | Eveker et al. |
| 7,175,136 | B2 * | 2/2007 | Shah et al. ............... 244/134 R |
| 7,469,862 | B2 | 12/2008 | Layland et al. |
| 7,694,505 | B2 | 4/2010 | Schilling |
| 7,762,081 | B2 * | 7/2010 | Williams .................. 60/772 |
| 7,780,117 | B2 | 8/2010 | Botura et al. |
| 7,837,150 | B2 | 11/2010 | Zecca et al. |
| 2008/0257033 | A1 * | 10/2008 | Roberts ................. 73/170.26 |
| 2009/0025937 | A1 | 1/2009 | Robinson et al. |
| 2009/0067993 | A1 * | 3/2009 | Roberge et al. ............ 415/145 |
| 2009/0120099 | A1 | 5/2009 | Brand et al. |
| 2009/0260345 | A1 | 10/2009 | Chaudhry |
| 2009/0277155 | A1 * | 11/2009 | Bulin et al. ................ 60/226.3 |
| 2009/0294593 | A1 * | 12/2009 | Jacquet-Francillon et al. ............... 244/134 R |
| 2010/0011740 | A1 * | 1/2010 | McVey ..................... 60/204 |
| 2010/0043390 | A1 * | 2/2010 | Jain et al. .................. 60/204 |
| 2010/0068039 | A1 | 3/2010 | Winter |
| 2010/0148396 | A1 | 6/2010 | Xie et al. |
| 2010/0150700 | A1 | 6/2010 | Strecker et al. |
| 2010/0218483 | A1 * | 9/2010 | Smith ...................... 60/262 |
| 2010/0229528 | A1 | 9/2010 | Ramlaoui et al. |
| 2010/0331139 | A1 | 12/2010 | McCune |

FOREIGN PATENT DOCUMENTS

| | | |
|---|---|---|
| GB | 2041090 | 9/1980 |
| WO | 2007038674 | 4/2007 |
| WO | 2008045079 A1 | 4/2008 |

OTHER PUBLICATIONS

Gunston, Bill, "Jane's Aero-Engines," Issue Seven, 2000, pp. 510-512.
International Preliminary Report on Patentability for PCT/US2013/022476. Date of Issuance Aug. 5, 2014.
Singapore Search Report and Written Opinion for Singapore Application No. 11201402942Q mailed Apr. 6, 2015.
Extended European Search Report for European Application No. 13775274.5, dated Sep. 18, 2015.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.

(56) References Cited

OTHER PUBLICATIONS

Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.

\* cited by examiner

GAS TURBINE ENGINE VARIABLE AREA
FAN NOZZLE WITH ICE MANAGEMENT

This application claims priority to U.S. Provisional Application No. 61/593,150, which was filed on Jan. 31, 2012.

BACKGROUND

This disclosure relates to managing gas turbine engine fan operability and operating characteristics using a variable area fan nozzle.

One typical gas turbine engine includes low and high speed spools housed within a core nacelle. The low speed spool supports a low pressure compressor and turbine, and the high speed spool supports a high pressure compressor and turbine. A fan is coupled to the low speed spool. A fan nacelle surrounds the fan and core nacelle to provide a bypass flow path having a nozzle. Typically, the nozzle is a fixed structure providing a fixed nozzle exit area.

The fan's operating line must be controlled to avoid undesired conditions such as fan flutter, surge or stall. The fan operating line can be manipulated during engine operation to ensure that the fan operability margin is sufficient. The fan operating line is defined, for example, by characteristics including low spool speed, bypass airflow and turbofan pressure ratio. Manipulating any one of these characteristics can change the fan operating line to meet the desired fan operability margin to avoid undesired conditions.

The engine is designed to meet the fan operability line and optimize the overall engine performance throughout the flight envelope. As a result, the engine design is compromised to accommodate various engine operating conditions that may occur during the flight envelope. For example, fuel consumption for some engine operating conditions may be less than desired in order to maintain the fan operating line with an adequate margin for all engine operating conditions. For example, fan operating characteristics are compromised, to varying degrees, from high Mach number flight conditions to ground idle conditions for fixed nozzle area turbofan engines. This creates design challenges and/or performance penalties to manage the operability requirements. Furthermore, the presence of ice on the engine can affect operation and, thus, should be managed.

SUMMARY

A method of managing a gas turbine engine variable area fan nozzle includes the step of evaluating an icing condition to determine the likelihood of ice presence. A variable area fan nozzle position is altered if ice is likely present or actually present.

In a further embodiment of any of the above, the evaluating step includes using an algorithm that relies upon one or more icing condition inputs from at least one of a temperature sensor, air speed and a humidity sensor In a further embodiment of any of the above, the altering step includes adjusting a fan nacelle exit area in response to an altered variable area fan nozzle position schedule.

In a further embodiment of any of the above, the adjusting step includes translating flaps to selectively block a vent in the fan nacelle.

In a further embodiment of any of the above, the variable area fan nozzle position schedule corresponds to the flaps being at least partially open at air speeds below 0.55 Mach. The altering step includes closing the flaps below 0.55 Mach.

In a further embodiment of any of the above, the variable area fan nozzle position schedule corresponds to the flaps at least partially open at air speeds below 0.55 Mach, and the altering step includes closing the flaps below 0.55 Mach.

In a further embodiment of any of the above, the flaps are fully open below 0.38 Mach in an unaltered variable area fan nozzle position schedule.

In a further embodiment of any of the above, the gas turbine engine includes a fan is arranged in a fan nacelle including a flap configured to be movable between first and second positions. An actuator is operative coupled to the flap. A compressor section is fluidly connected to the fan, and the compressor includes a high pressure compressor and a low pressure compressor. A combustor is fluidly connected to the compressor section, and a turbine section is fluidly connected to the combustor. The turbine section includes a high pressure turbine coupled to the high pressure compressor via a shaft, and a low pressure turbine.

In a further embodiment of any of the above, the gas turbine engine is a high bypass geared aircraft engine having a bypass ratio of greater than about six (6).

In a further embodiment of any of the above, the gas turbine engine includes a low Fan Pressure Ratio of less than about 1.45.

In a further embodiment of any of the above, the low pressure turbine has a pressure ratio that is greater than about 5.

The gas turbine engine includes a fan nacelle having a flap configured to be moveable between first and second positions. An actuator is operatively coupled to the flap. A controller is configured to evaluate an icing condition to determine the likelihood of ice presence. The controller is configured to alter a variable area fan nozzle position schedule if ice is likely present or actually present by providing a command to the actuator to adjust the flap from the first position to the second position.

In a further embodiment of any of the above, the first position is open and the second position is closed.

In a further embodiment of any of the above, a geared architecture is coupled between a low speed spool and a fan. The fan is arranged within the fan nacelle.

In a further embodiment of any of the above, a compressor section is fluidly connected to the fan, and the compressor includes a high pressure compressor and a low pressure compressor. A combustor is fluidly connected to the compressor section, and a turbine section is fluidly connected to the combustor. The turbine section includes a high pressure turbine coupled to the high pressure compressor via a shaft, and a low pressure turbine.

In a further embodiment of any of the above, the gas turbine engine is a high bypass geared aircraft engine having a bypass ratio of greater than about six (6).

In a further embodiment of any of the above, the gas turbine engine includes a low Fan Pressure Ratio of less than about 1.45.

In a further embodiment of any of the above, the low pressure turbine has a pressure ratio that is greater than about 5.

In a further embodiment of any of the above, the variable area fan nozzle position schedule corresponds to the flaps at least partially open at air speeds below 0.55 Mach, and the command includes closing the flaps below 0.55 Mach.

In a further embodiment of any of the above, the flaps are fully open below 0.38 Mach in an unaltered variable area fan nozzle position schedule.

BRIEF DESCRIPTION OF THE DRAWINGS

The disclosure can be further understood by reference to the following detailed description when considered in connection with the accompanying drawings wherein.

DETAILED DESCRIPTION

Figure 1:
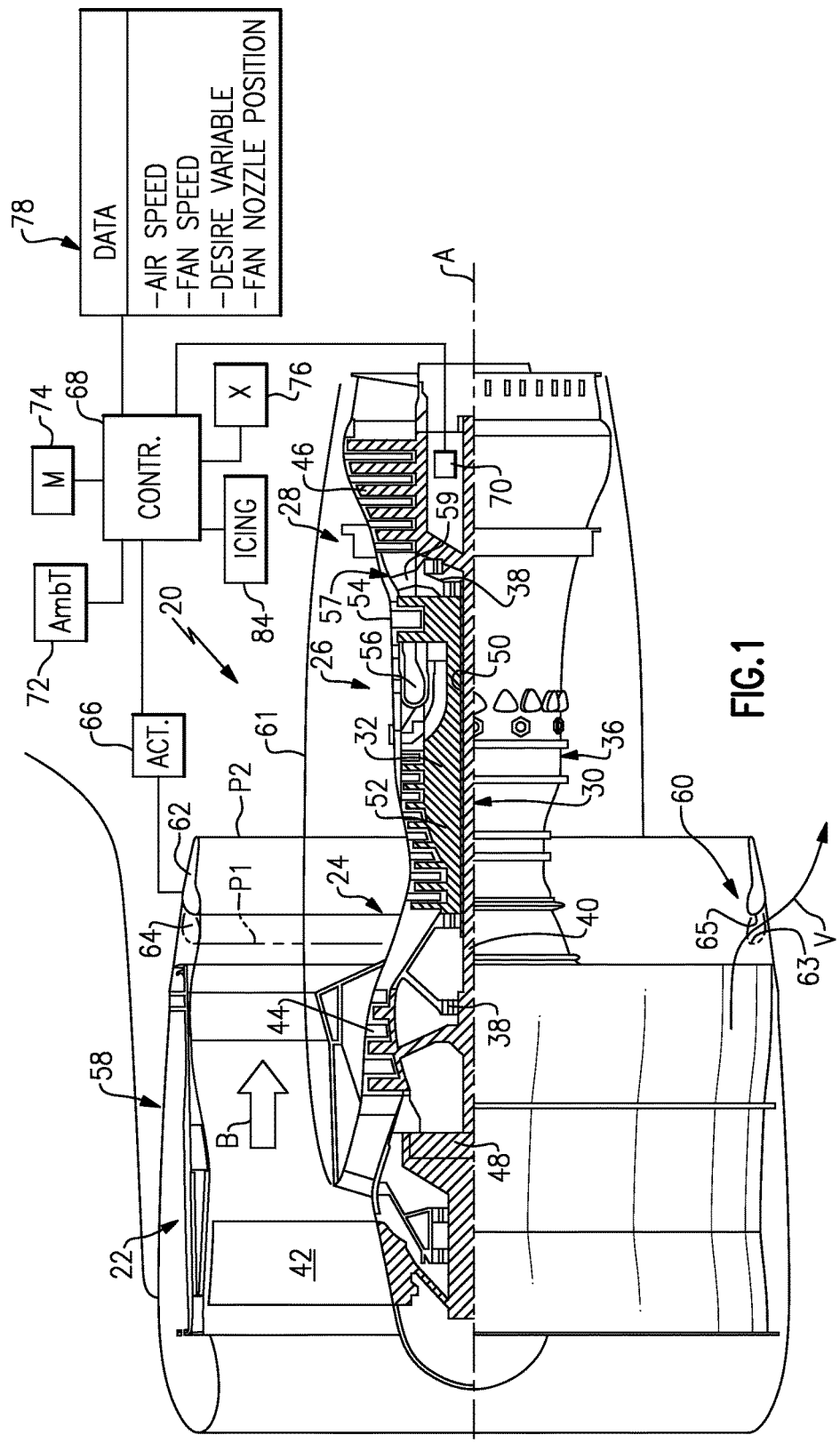
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include a three-spool architecture, an augmentor section, or different engine section arrangements, among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and, for example, greater than about 2.5:1 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm per hour of fuel being burned divided by lbf of thrust the engine produces at that minimum point. "Fan pressure ratio" is the pressure ratio across the fan blade alone, without a Fan Exit Guide Vane ("FEGV") system. The fan pressure ratio as disclosed herein according to one non-limiting embodiment is less than about 1.45. "Low corrected fan tip speed" is the actual fan tip speed in ft/sec divided by an industry standard temperature correction of $[(\text{Tambient deg R})/518.7)^{0.5}]$. The "Low corrected fan tip speed," as disclosed herein according to one non-limiting embodiment, is less than about 1150 ft/second.

A core nacelle 61 surrounds the engine static structure 36. A fan nacelle 58 surrounds the core nacelle 61 to provide the bypass flow path. In the example engine 20, a nozzle exit area 60 is effectively variable to alter the bypass flow B and achieve a desired target operability line. In one example, the fan nacelle 58 includes moveable flaps 62 near the bypass flowpath exit, which may be provided by arcuate segments that are generally linearly translatable parallel to the axis A in response to inputs by one or more actuators 66.

The flaps 62 are moveable between first and second positions P1, P2 and positions in between. The flaps 62 selectively regulate, by blocking, a size of an annular vent 64 provided between a trailing end 63 of the nacelle body and a leading edge 65 of the flaps 62. The vent 64 is fully open in the second position P2, in which a vent flow V from the bypass flowpath is permitted to exit through the vent 64. An open vent 64 increases the bypass flow B and effectively increases the nozzle exit area 60. With the flaps 62 in the first position P1, flow from the bypass flowpath is not permitted to pass through the vent 64, which is blocked by the flaps 62.

A controller 68 is in communication with a low speed spool sensor 70, which detects a rotational speed of the low speed spool 30. A temperature sensor 72 detects the ambient temperature. Air speed 74 is provided to the controller 68, as is the ambient temperature. In the example, the controller 68 may store various parameters 76 relating to the engine 20, such as a gear reduction ratio of the geared architecture 48, outer diameter of the fan 22 and other information useful in calculating a corrected low fan tip speed.

A parameter relationship 78, such as one or more data tables (such as a bivariant look-up table) and/or equations, for example, may be stored in the controller 68. The parameter relationship 78 includes information relating to air speed, fan speed and a desired variable area fan nozzle position, which provide a schedule illustrated in FIG. 2. In operation, the turbofan engine operating line is managed by detecting the air speed and other parameters, such as the fan speed, for example, by determining the low speed spool rotational speed. In should be understood, however, that the fan speed may be inferred from the low speed spool rotational speed rather than calculated. That is, only the low speed spool rotational speed could be monitored and compared to a reference low speed spool rotational speed in the parameter relationship 78, rather than a fan speed. The controller 68 references the parameter relationship 78, which includes a desired variable area fan nozzle position relative to the air speed and fan speed. In one example, the detected air speed and fan speed are compared to the data table to provide a target variable area fan nozzle position. The controller 68 commands the actuators 66 to adjust the flaps 62 from an actual variable area fan nozzle position, or the current flap position, to the target variable area fan nozzle position.

Figure 2:
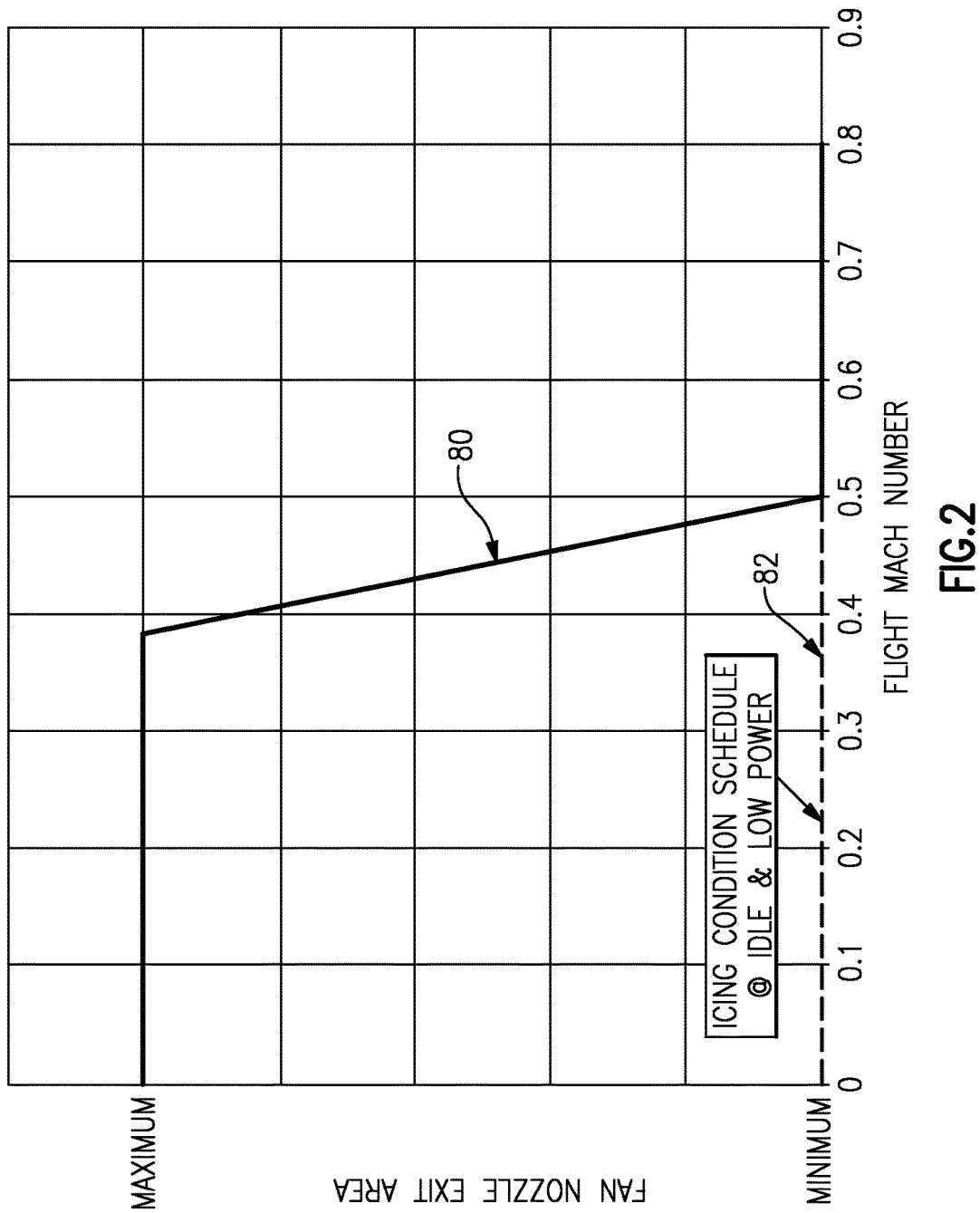
FIG. 2 is an example schedule for varying a fan nacelle exit area based upon air speed and icing conditions.

One example schedule 80 for a target variable area fan nozzle position, corresponding to fan nozzle exit area, based upon airspeed is illustrated in FIG. 2. As shown in the example in FIG. 2, the flaps 62 are at least partially open at air speeds below 0.55 Mach, and in another example, below 0.50 Mach. In one example, the flaps 62 are fully opened below 0.38 Mach in an unaltered variable area fan nozzle position schedule.

An icing condition input 84 communicates with and is used by the controller 68. The icing condition input 84 is used to predict the presence of ice in the area of the vent 62 using the parameter relationship 78, for example, which could inhibit desired operation of the flaps 62 during the flight envelope. In one example, an algorithm determines the likelihood of the presence of ice using data from a temperature sensor, air speed, humidity sensor and/or other devices or information determines the likelihood of ice presence near or at the vent 62. If an ice condition is detected, either actual or predicted ice presence, below 0.55 Mach, the normal schedule 80 is altered to provide an icing schedule 82, and the flaps 62 are moved to or maintained in a closed position (first position P1 in FIG. 1), for the example, where the fan speed is below 65% of the fan aerodynamic design speed. In one example, the schedule 80 is altered by commanding the flaps 62 to the closed position. In another example where the fan speed is above 70% of the fan aerodynamic design speed, the variable area fan nozzle position follows schedule 80 as a function of airspeed.

The controller 68 can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 68 may be a hardware device for executing software, particularly software stored in memory. The controller 68 can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

The controller 68 can be configured to execute software stored within the memory, to communicate data to and from the memory, and to generally control operations of the computing device pursuant to the software. Software in memory, in whole or in part, is read by the processor, perhaps buffered within the processor, and then executed.

Although an example embodiment has been disclosed, a worker of ordinary skill in this art would recognize that certain modifications would come within the scope of the claims. For that reason, the following claims should be studied to determine their true scope and content.

What is claimed is:

1. A method of managing a gas turbine engine variable area fan nozzle, comprising the steps of: operating a variable area fan nozzle arranged downstream from a fan that is in a fan nacelle, the variable area fan nozzle operated according to a first operating schedule; evaluating an icing condition input to determine the likelihood of ice presence; altering the first operating schedule, which provides a variable area fan nozzle position, if ice is likely present or actually present to provide an icing operating schedule different than the first operating schedule; wherein the first operating schedule corresponds to the flaps at least partially open at air speeds below 0.55 Mach, and the altering step includes closing the flaps below 0.55 Mach as part of the icing operating schedule; and adjusting the variable area fan nozzle position according to the icing operating schedule, and the adjusting step includes translating flaps to selectively block a vent in the fan nacelle, and the icing condition relates to ice present or likely present in an area of the vent.

2. The method according to claim 1, wherein the first operating schedule corresponds to the flaps at least partially open at air speeds below 0.50 Mach, and the altering step includes closing the flaps below 0.50 Mach as part of the icing operating schedule.

3. The method according to claim 2, wherein the flaps are fully open below 0.38 Mach in the first operating schedule.

4. A gas turbine engine comprising:
a fan nacelle including a flap configured to be movable between first and second positions;
an actuator operatively coupled to the flap; and
a controller configured operate the flap according to a first operating schedule, to evaluate an icing condition to determine the likelihood of ice presence, and the controller configured to alter the first operating schedule, which provides a variable area fan nozzle position, if ice is likely present or actually present by providing a command to the actuator in accordance with an icing operating schedule that is different than the first operating schedule to adjust the flap from the first position to the second position according to the icing operating schedule, and the first operating schedule corresponds to the flaps at least partially open at air speeds below 0.55 Mach, and the command includes closing the flaps below 0.55 Mach as part of the icing operating schedule.

5. The gas turbine engine according to claim 4, wherein the first position is open and the second position is closed.

6. The gas turbine engine according to claim 4, comprising a geared architecture coupled between a low speed spool and a fan, the fan arranged within the fan nacelle.

7. The gas turbine engine according to claim 6, comprising:
a compressor section fluidly connected to the fan, the compressor comprising a high pressure compressor and a low pressure compressor;
a combustor fluidly connected to the compressor section;
a turbine section fluidly connected to the combustor, the turbine section comprising:
a high pressure turbine coupled to the high pressure compressor via a shaft; and
a low pressure turbine.

8. The gas turbine engine according to claim 6, wherein the gas turbine engine is a high bypass geared aircraft engine having a bypass ratio of greater than about six (6).

9. The gas turbine engine according to claim 7, wherein the low pressure turbine has a pressure ratio that is greater than about 5.

10. The gas turbine engine according to claim 4, wherein the flaps are fully open below 0.38 Mach in the first operating schedule.

11. The gas turbine engine according to claim 4, wherein the first operating schedule corresponds to a non-icing operating schedule.

* * * * *

UNITED STATES PATENT AND TRADEMARK OFFICE
CERTIFICATE OF CORRECTION

PATENT NO. : 9,593,628 B2
APPLICATION NO. : 13/365481
DATED : March 14, 2017
INVENTOR(S) : Geoffrey T. Blackwell, William G. Tempelman and William J. McVey It is certified that error appears in the above-identified patent and that said Letters Patent is hereby corrected as shown below:

In the Claims

In Claim 1, Column 6, Line 53; before "flaps" delete "the"

In Claim 1, Column 6, Line 58; after "translating" insert --the--

In Claim 4, Column 7, Line 5; after "configured" insert --to--

In Claim 4, Column 7, Line 16; before "at least" replace "flaps" with --flap--

In Claim 10, Column 8, Line 19; before "fully" replace "flaps are" with --flap is--

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*